US007124938B1

(12) United States Patent
Marsh

(10) Patent No.: US 7,124,938 B1
(45) Date of Patent: Oct. 24, 2006

(54) ENHANCING SMART CARD USAGE FOR ASSOCIATING MEDIA CONTENT WITH HOUSEHOLDS

(75) Inventor: David J Marsh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/534,916

(22) Filed: Mar. 23, 2000

Related U.S. Application Data

(60) Provisional application No. 60/125,998, filed on Mar. 24, 1999.

(51) Int. Cl.
*G06K 5/00* (2006.01)
(52) U.S. Cl. .................. 235/382; 235/380; 235/492; 380/200
(58) Field of Classification Search ............... 235/380, 235/382, 379; 380/52, 20, 21, 200
See application file for complete search history.

(56) References Cited

U.S. PATENT DOCUMENTS

| | | | | | |
|---|---|---|---|---|---|
| 4,341,951 | A | * | 7/1982 | Benton ..................... 235/379 |
| 5,426,701 | A | * | 6/1995 | Herrmann et al. ............ 380/52 |
| 5,509,073 | A | * | 4/1996 | Monnin ..................... 380/20 |
| 5,530,750 | A | * | 6/1996 | Akagiri ..................... 704/500 |
| 5,592,212 | A | * | 1/1997 | Handelman ................. 348/12 |
| 5,661,517 | A | * | 8/1997 | Budow et al. ............... 725/104 |
| 5,666,412 | A | * | 9/1997 | Handelman et al. ........ 235/382 |
| 5,744,787 | A | * | 4/1998 | Teicher ..................... 235/380 |
| 5,757,909 | A | * | 5/1998 | Park ......................... 380/201 |
| 5,796,824 | A | | 8/1998 | Hasebe et al. |
| 5,799,081 | A | * | 8/1998 | Kim et al. .................. 380/203 |
| 5,805,204 | A | * | 9/1998 | Thompson et al. .......... 348/13 |
| 5,841,119 | A | * | 11/1998 | Rouyrre et al. ............. 235/380 |
| 5,852,664 | A | * | 12/1998 | Iverson et al. ............. 340/5.31 |
| 5,933,500 | A | * | 8/1999 | Blatter et al. ............. 380/200 |
| 6,005,940 | A | | 12/1999 | Kulinets |
| 6,035,329 | A | * | 3/2000 | Mages et al. ............... 709/217 |
| 6,038,551 | A | * | 3/2000 | Barlow et al. ............. 235/380 |
| 6,055,314 | A | | 4/2000 | Spies et al. |
| 6,075,858 | A | | 6/2000 | Schwartzman |
| 6,104,860 | A | * | 8/2000 | Lee et al. .................. 386/94 |

(Continued)

FOREIGN PATENT DOCUMENTS

EP      0 706 291 A2    4/1996

(Continued)

OTHER PUBLICATIONS

"Functional Model of a Conditional Access System", EBU Review Group, No. 266, Dec. 21, 1995, pp. 64-77.

*Primary Examiner*—Seung Ho Lee
(74) *Attorney, Agent, or Firm*—Lee & Hayes, PLLC

(57) ABSTRACT

Various enhancements are made to using smart cards that are associated with (or to be associated with) a household. In one embodiment, data that is expected to be of value to a user (e.g., electronic money) is attached to that user's smart card(s), thereby providing an incentive for the user to keep his or her smart card(s) secure. In another embodiment, the smart cards are used for parental control (e.g., by restricting the children's access to one or more of the smart cards). In yet another embodiment, smart cards are used to enhance user privacy by maintaining user-specific information on the smart cards (which can be de-coupled from the computing device whenever the user desires). In another embodiment, the boundaries of a network of computing devices are defined by multiple smart cards—any computing device to which a smart card is coupled is part of the network.

51 Claims, 7 Drawing Sheets

U.S. PATENT DOCUMENTS

| | | |
|---|---|---|
| 6,126,069 A * | 10/2000 | Stiefel et al. ............... 235/380 |
| 6,157,719 A * | 12/2000 | Wasilewski et al. .......... 380/21 |
| 6,219,439 B1 * | 4/2001 | Burger ....................... 235/380 |
| 6,289,314 B1 | 9/2001 | Matsuzake et al. |
| 6,363,210 B1 * | 3/2002 | Owashi et al. ................ 360/60 |
| 6,374,402 B1 | 4/2002 | Schmeidler et al. |
| 6,378,130 B1 * | 4/2002 | Adams ....................... 709/219 |
| 6,411,712 B1 * | 6/2002 | Yoshida et al. ............... 380/37 |
| 6,424,715 B1 | 7/2002 | Saito |

FOREIGN PATENT DOCUMENTS

| | | |
|---|---|---|
| WO | WO 96/08912 | 3/1996 |
| WO | WO 98/43426 | 10/1998 |

* cited by examiner

ENHANCING SMART CARD USAGE FOR ASSOCIATING MEDIA CONTENT WITH HOUSEHOLDS

RELATED APPLICATIONS

This application claims the benefit of U.S. Provisional Application No. 60/125,998, filed Mar. 24, 1999, entitled "TV-Style Broadcast on a Personal Computer Platform", to David J. Marsh.

TECHNICAL FIELD

This invention relates to smart cards and content security. More particularly, the invention relates to enhancing smart card usage for associating media content with households.

BACKGROUND OF THE INVENTION

Personal computers are encroaching upon the area occupied by more traditional home entertainment systems. Rendering of audio and/or video content, such as movies, on personal computers is becoming increasingly popular. For example, personal computers can be equipped with DVD (digital versatile disk) drives that allow the computer to render movies from DVDs. By way of another example, personal computers can be equipped with television tuner expansion cards or other components that allow television signals to be received (e.g., via antenna or cable) by the computer for rendering. This encroachment is expected to continue, resulting in the replacement of traditional separate entertainment system components (e.g., VCR, DVD player, etc.) with a personal computer.

The creators of audio and/or video content, however, are very concerned with the security of personal computers. Traditional entertainment system components are "closed" boxes (they cannot be easily opened and components accessed, removed, modified, replaced, etc. while leaving the components operable) and thus relatively secure. Personal computers, in contrast, are "open" boxes—a portion of the housing can be removed and components (e.g., expansion cards) can be removed and replaced, new components can be installed, components (e.g., buses) can be accessed, etc. This creates a significant security risk for the content creators, because even though the personal computer designer/manufacturer may design the components of the computer to not perform any unauthorized tasks (e.g., inappropriate copying of descrambled content), there is often nothing preventing a malicious user from adding an additional expansion card (e.g., coupled to a bus of the computer) that does perform unauthorized tasks (e.g., copies the descrambled content from the bus for unauthorized distribution). In order for the content manufacturers to trust the security of open systems such as personal computers, a way to ensure the security of such content needs to be provided.

However, an additional factor that needs to be accounted for is the user response to any such security mechanisms. While most users understand, and accept, that they are not supposed to make unauthorized copies of content (e.g., copy movies for their friends, copy movies to the Internet, etc.), most users also do not want to be limited in their own enjoyment of movies and other premium content. For example, when people purchase a movie they may want to be able to watch it on different televisions in their house at different times, or take it to a friend's house and watch it there. Thus, it would be beneficial to provide a way to ensure the security of such content while at the same time not significantly interfering with a user's ability to enjoy the content he or she legitimately acquires.

The invention described below addresses these disadvantages, enhancing smart card usage for associating media content with households.

SUMMARY OF THE INVENTION

Enhancing smart card usage for associating media content with households is described herein. Various enhancements are made to using smart cards to encrypt and/or decrypt media content that is associated with (or to be associated with) a household.

According to one aspect, data that is expected to be of value to a user is attached to that user's smart card(s), thereby providing an incentive for the user to keep his or her smart card(s) secure. In one implementation, this data is electronic money that can be spent by the user for various goods and services. The smart card, however, can only be used to encrypt and decrypt media content if at least a threshold amount of electronic money is stored on the card. The user is thus aware that loss of the smart card (or lending of the smart card to someone else) can result in a loss of the electronic money stored on the card, providing the user with an incentive to keep his or her smart cards safe and secure.

According to another aspect, the smart cards are used for parental control. By encrypting media content with the smart card, parents can limit the ability of their children to render the media content by restricting the access the children have to the smart card. Additionally, different smart cards can be used to encrypt different categories of media content. For example, media content that the children can watch can be encrypted using one smart card, while adult-oriented content that the children should not watch can be encrypted using another smart card that the children are not given access to. By way of another example, the rating on the smart card can be used to block broadcasts of inappropriate content.

According to another aspect, smart cards are used to enhance user privacy. Various user-specific information can be stored on smart cards, such as user preferences regarding media content (e.g., preferred viewing times, preferred content type, etc.). Storing this information on a smart card ensures that the information cannot be accessed by a computing device unless the smart card is coupled to that computing device (e.g., by inserting the smart card into a smart card reader).

According to another aspect, the boundaries of a network of computing devices can be identified using multiple similar smart cards. The smart cards can be identical, or merely similar (at the least use the same key(s) to encrypt and/or decrypt media content). Media content can be encrypted and/or decrypted only by computing devices that have a smart card coupled to them (e.g., inserted into a smart card reader). The boundaries of the network are thus defined by the multiple smart cards—any computing device to which a smart card with the same household identifier is coupled is part of the network. The boundaries of the network can also be easily changed by moving one or more of the smart cards.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

In the discussion below, embodiments of the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, gaming consoles, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, all or part of the invention can be implemented in one or more application specific integrated circuits (ASICs).

Figure 1:
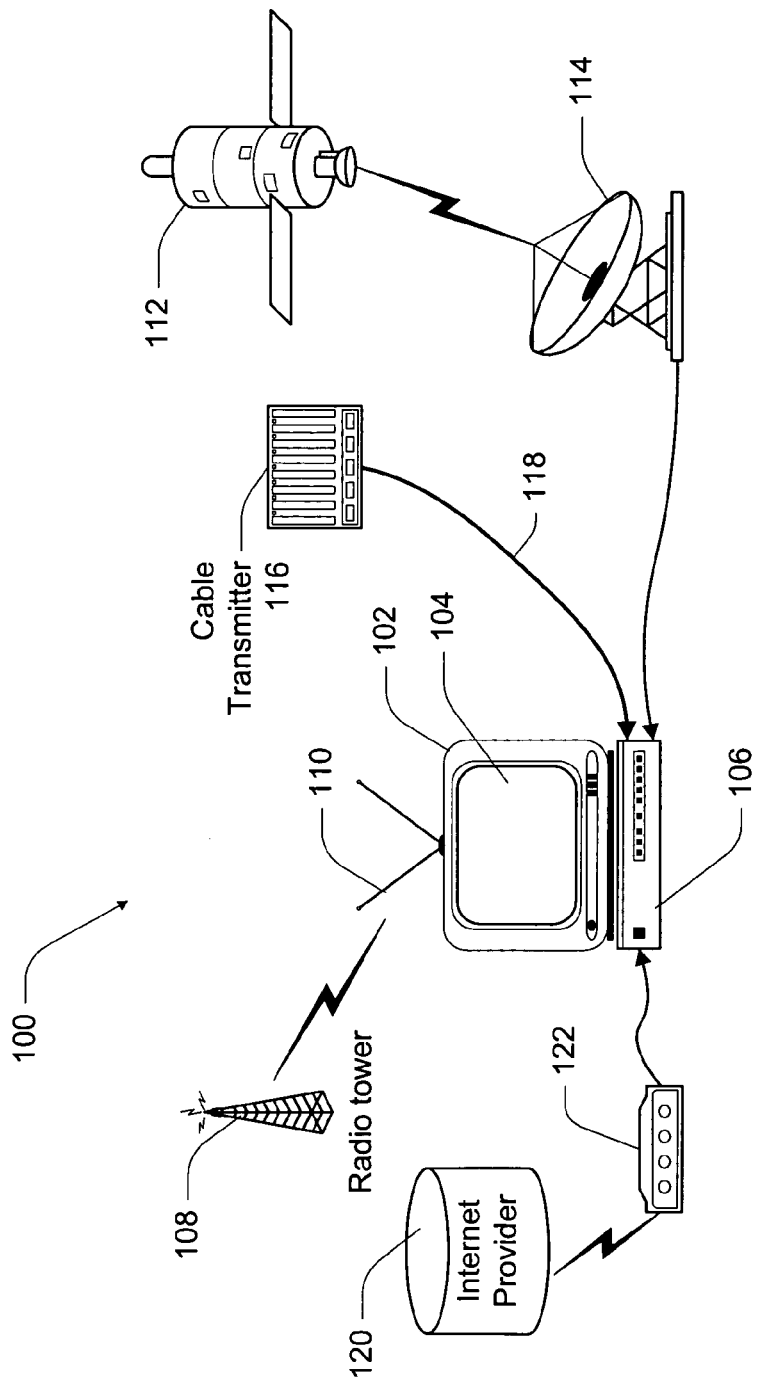
FIG. 1 shows an exemplary entertainment distribution and viewing system in accordance with certain embodiments of the invention.

FIG. 1 shows an exemplary entertainment distribution and viewing system 100 in accordance with certain embodiments of the invention. Entertainment system 100 includes a media content rendering system 102 having a display device including a viewing area 104. Media content rendering system 102 represents any of a wide variety of devices for rendering video and/or audio content as well as other types of media content, collectively referred to as "data content", such as text, graphics, animation, etc. System 102 can be, for example, a personal computer, a gaming console, other types of computing devices, etc. Receiver 106 is connected to receive and render media content from multiple different programming sources. Media content can be rendered individually or alternatively multiple types of media content can be rendered concurrently (e.g., a multimedia presentation). Additionally, media content can be delivered to receiver 106 in its entirety (e.g., an entire program) before rendering begins, or alternatively rendering may begin prior to receiving the entirety of the content (e.g., streaming media content). Although illustrated as separate components, rendering system 102 may be combined with receiver 106 into a single component (e.g., a personal computer or television).

While audio and video have traditionally been transmitted using analog formats over the airwaves, current and proposed technology allows media content transmission over a wider range of network types, including digital formats over the airwaves, different types of cable and satellite systems (employing both analog and digital transmission formats), wired or wireless networks such as the Internet, etc.

FIG. 1 shows several different physical sources of programming, including a terrestrial television broadcasting system 108 which can broadcast analog or digital signals that are received by antenna 110; a satellite broadcasting system 112 which can transmit analog or digital signals that are received by satellite dish 114; a cable signal transmitter 116 which can transmit analog or digital signals that are received via cable 118; and an Internet provider 120 which can transmit digital signals that are received by modem 122 (or similar network interface components, such as a router). Both analog and digital signals can include audio, video, and/or data content. Other programming sources might be used in different situations, including interactive television systems.

In one implementation, analog signals are encoded upon receipt by the receiver 106 in order to put the signals into a computer friendly digital form.

Additional network(s) may also be involved in the distribution of audio, video, and/or data content to system 102. By way of example, system 102 may be included as part of a home network (not shown), with the audio, video, and/or data content being stored at a server (not shown) prior to transmission to system 102.

Typically, audio, video, and data content for a particular program (or portion thereof) will be transmitted from the same source (e.g., all of the content for a particular movie may be received from cable transmitter 116). Alternatively, the audio, video, and data content for a program may be transmitted from multiple sources (e.g., the audio and video content may be received from cable transmitter 116, while the data content is received from Internet provider 120).

Figure 2:
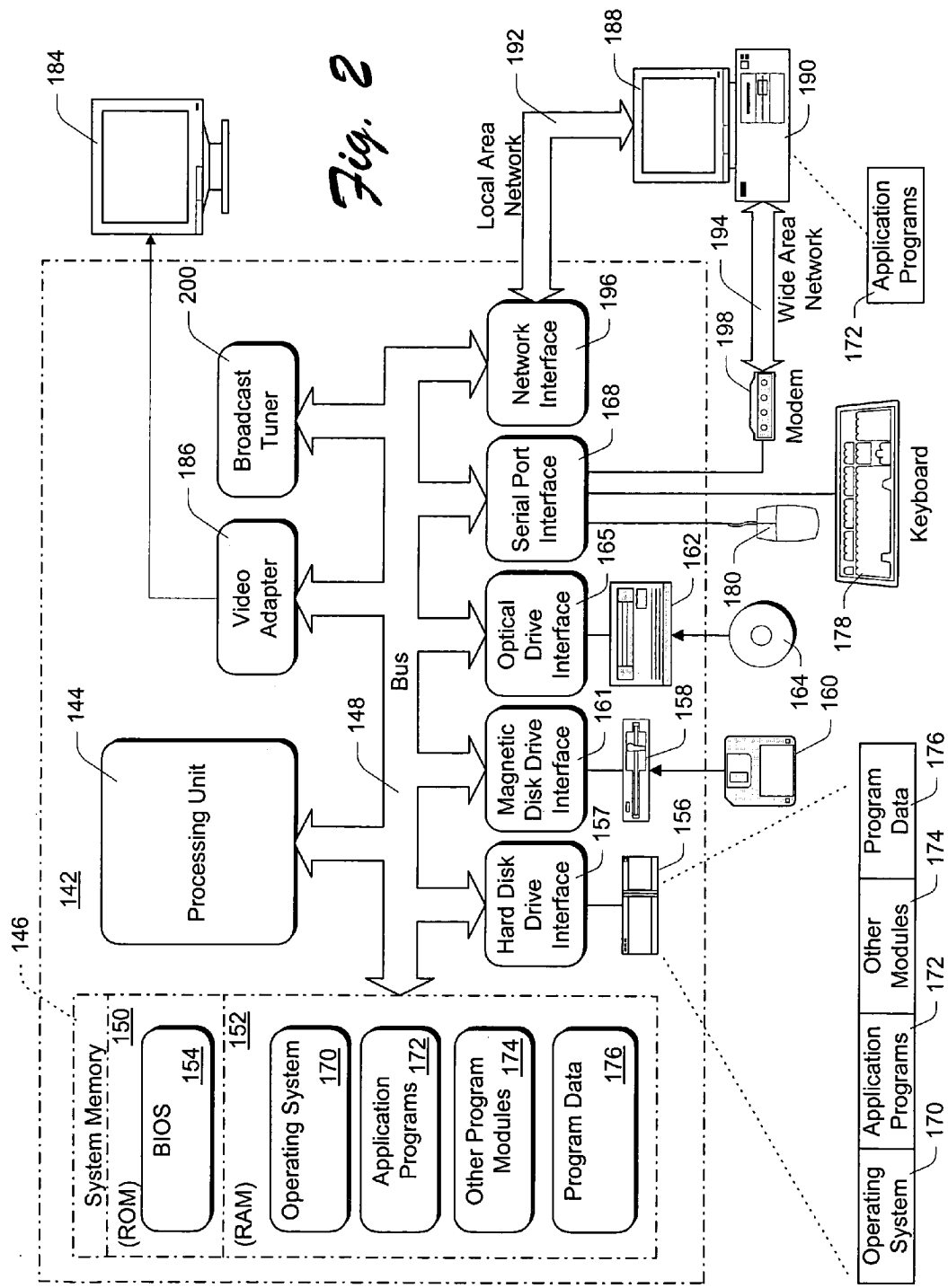
FIG. 2 shows a general example of a computer that can be used in accordance with certain embodiments of the invention.

FIG. 2 shows a general example of a computer 142 that can be used in accordance with certain embodiments of the invention. Computer 142 is shown as an example of a computer that can perform the functions of rendering system 102 of FIG. 1. Computer 142 includes one or more processors or processing units 144, a system memory 146, and a bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 optionally operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program (which may optionally be integrated into the operating system 170) such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other component for establishing communications over the wide area network 194, such as the Internet. The modem 198, which may be internal or external, is connected to the system bus 148 via an interface (e.g., a serial port interface 168). In a networked environment, program modules depicted relative to the personal computer 142, or portions thereof, may be stored in the remote memory storage device. It is to be appreciated that the network connections shown are exemplary and other means of establishing a communications link between the computers may be used.

Computer 142 also optionally includes one or more broadcast tuners 200. Broadcast tuner 200 receives broadcast signals either directly (e.g., analog or digital cable transmissions fed directly into tuner 200) or via a reception device (e.g., via antenna 110 or satellite dish 114 of FIG. 1).

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
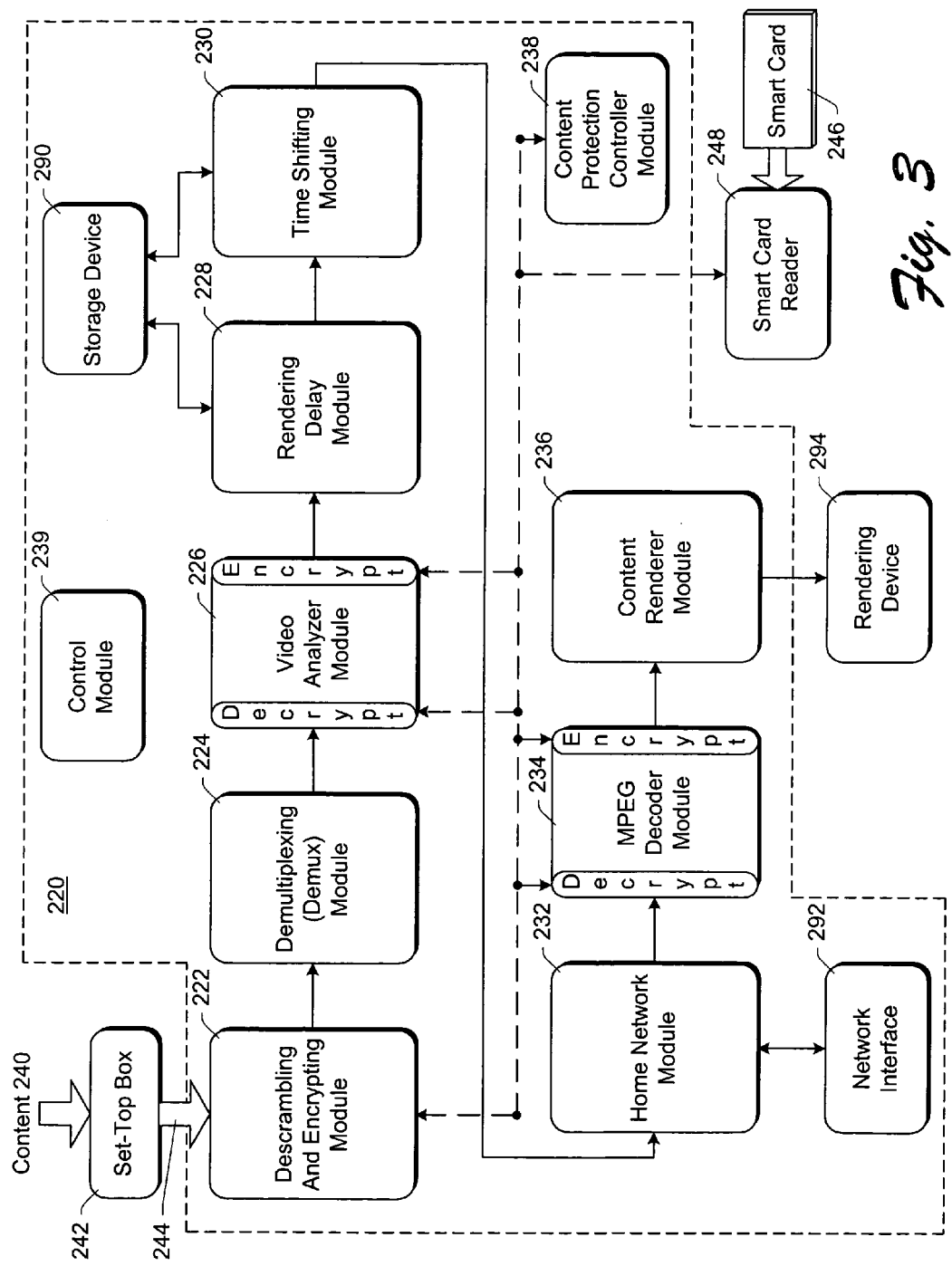
FIG. 3 is a block diagram illustrating an exemplary content storage and rendering system in accordance with certain embodiments of the invention.

FIG. 3 is a block diagram illustrating an exemplary content storage and rendering system in accordance with certain embodiments of the invention. A system 220 is illustrated that receives media content and can transmit the received media content to another computing device or to a rendering device(s). System 220 may also optionally store received media content for later viewing. System 220 can be, for example, a receiver 106 of FIG. 1 or a computer 142 of FIG. 2.

System 220 includes a descrambling and encrypting module 222, a demultiplexing module 224, an example video analyzer module 226, a viewing delay module 228, a time shifting module 230, a home network module 232, an MPEG (Motion Pictures Experts Group) decoding module 234, a content rendering module 236, and a content protection controller module 238. Each of these modules 222–238 can be implemented in software, firmware, hardware, or a combination thereof. Additionally, although illustrated as separate modules, one or more of modules 222–238 may be combined into a single module (e.g., rendering delay module 228 and time shifting module 230 may be a single module). In one example, the modules 222–238 are implemented using filters in accordance with the "DirectShow" architecture, although other architectures can be used in alternative implementations. Additional information regarding the "DirectShow" architecture and "DirectShow" application programming interface is available from Microsoft Corporation of Redmond, Wash. Different ones of the modules 222–238 may operate on particular media content, as discussed in more detail below.

An additional control module 239 manages the operation of the different modules 222–238, informing each of any parameters it needs to perform its function (e.g., how to distinguish between audio and video content, the network address of another computing device that content is to be transferred to, etc.). Control module 239 also manages the interaction of the different modules 222–238, informing each module which other module(s) it is to input content to and/or receive content from. Alternatively, rather than a centralized control module 239, the control functionality may be distributed among one or more of the modules 222–238.

Media content 240 is received by a set-top box 242 or module of system 220 with a similar function (not shown)

and input to descrambling and encrypting module 222. Media content 240 can include any of a wide variety of content and can include multiple types of media concurrently, including primary content (e.g., audio and video) as well as enhancement data content such as that corresponding to the Advanced Television Enhancement Forum (ATVEF) standard (additional information regarding ATVEF is available from Microsoft Corporation) or other enhanced television standards. Examples of media content 240 include audio or sound, video, moving graphics or motion pictures, still graphics, animation, textual content, command script sequences, as well as other types of content that can be sensed and/or perceived by a human.

The manner in which media content 240 is received by set-top box 242 can vary depending on the nature of content 240 as well as the transmitter of content 240. Set-top box 242 can be configured to receive content 240 from a wide variety of sources, such as those discussed above with reference to FIG. 1.

In the illustrated example, set-top box 242 implements a conditional access content protection scheme. The conditional access scheme allows set-top box 242 to limit the type of media content 240 that can be received and provided to system 220 for rendering. A variety of different conditional access schemes can be employed on a per-program basis, a per-source basis, etc. By way of example, set-top box 242 may remove scrambling introduced by the transmitter (or producer, etc.) of content 240 based on default or programmable settings in set-top box 242, based on a smart card (not shown) and/or PCMCIA card (not shown) provided by a service provider with the proper encodings/settings indicating the user has paid for the content, etc. Alternatively, no conditional access content protection scheme may be implemented by set-top box 242.

In the illustrated example, set-top box 242 provides received content 240 that satisfies the conditional access scheme to descrambling and encrypting module 222 via a coupling 244. Set-top box 242 scrambles the content it passes to module 222 in order to prevent a malicious user from tapping into the signal passed between box 242 and module 222 and inappropriately using the content. Coupling 244 can be any of a variety of communications mechanisms, including both wired and wireless. In one implementation, coupling 244 is a USB (Universal Serial Bus) or IEEE 1394 connection. The scrambling introduced by set-top box 242 can be any of a wide variety of scrambling mechanisms, such as 5C scrambling (as defined in the 5C IEEE 1394 Proposal, rev. 1.0, "5C Digital Transmission Content Protection Specification", Volume I, Feb. 18, 1999).

Although set-top box 242 is illustrated as a separate component from system 220, box 242 can alternatively be included as part of system 220. By way of example, the functionality of box 242 may be implemented on an expansion card that can be added to system 220 (e.g., a card that "plugs in" to a PCI slot of system 220).

Descrambling and encrypting module 222 receives the scrambled content from set-top box 242 and descrambles the content. Module 222 knows (e.g., is programmed with, or has access to multiple additional modules (not shown)) the manner in which content from box 242 is scrambled and is thus able to de-scramble such content. Alternatively, some content may be received by module 222 which is not scrambled, and thus the descrambling process is not necessary.

In order to maintain the security of the de-scrambled content inside system 220 (e.g., to avoid having a malicious user copy content as it is transferred along a bus (such as a PCI bus) inside system 220), the media content is also encrypted by module 222. This encryption is based on a household identifier corresponding to a smart card 246, as discussed in more detail below. By so encrypting the media content, the content is tied to a particular household (e.g., a particular person or group of people, such as a family). In one implementation, all content is encrypted by module 222. Alternatively, only content which is received in scrambled format may be encrypted, or some other indicator of which content to encrypt may be used (e.g., header information in the received content, pre-defined date and/or time ranges of content to be encrypted, etc.).

Any of a wide variety of encryption algorithms can be used by module 222 to encrypt the media content. In one implementation, encryption algorithms based on public-key cryptography are used, such as either of the well-known Rivest-Shamir-Adleman (RSA) or Elliptic Curve Cryptography (ECC) encryption schemes. Alternatively, other types of encryption that are not public-key can be used, such as the RC4 encryption scheme (additional information regarding RC4 is available from RSA Security, Inc. of Bedford, Mass.) or the AES (Advanced Encryption Standard) encryption scheme (additional information regard AES is available from the National Institute of Standards and Technology in Washington, D.C.). In situations where public-key cryptography is not used, a public key/private key pair may still be stored on smart card 246 for authentication purposes, as discussed in more detail below.

System 220 is coupled to a smart card reader 248 (e.g., via a standard connection such as a USB connection), allowing descrambling and encrypting module 222 to communicate with smart card reader 248 via content protection controller module 238. Smart card 246 can be coupled to smart card reader 248 in a variety of different manners, including physical touching (e.g., electrical contacts of smart card reader 248 being placed in physical contact with electrical contacts of smart card 246) or without such physical contact (e.g., a wireless connection, such as infrared, radio frequency, etc.). Smart card 246 is an integrated circuit card (ICC) which is typically the size of a standard credit card and which is capable of storing data and performing some processing. In one implementation, smart card 246 complies with the ISO 7816 standard. Although discussed herein as a smart card, other types of portable integrated circuit (IC) devices can alternatively be used.

Content protection controller module 238 includes various functionality to facilitate the protection of media content in system 220. In one implementation, module 238 includes software drivers that allow smart card reader 248 to communicate with other modules in system 220 and also includes cryptographic functions and processes (e.g., CryptoAPI functions and processes) that can be accessed by other modules in system 220. Additional information regarding CryptoAPI functions and processes is available from Microsoft Corporation of Redmond, Wash.

In order to encrypt media content, module 222 works in conjunction with smart card 246 and content protection controller module 238 to establish a secure communication channel to smart card 246. After establishing the secure communication channel, module 238 and/or 222 verifies the authenticity of smart card 246. Once smart card 246 is verified, the required key information used by module 222 to encrypt the media content is communicated along the secure communications channel from smart card 246 to module 222.

The secure communication channel established between module 222 and smart card 246, and typically in the particular example of the implementation via module 238, provides an assurance that other components cannot intercept and, modify, replay, decipher, etc. messages being exchanged between smart card 246 and module 222 via the channel. This is especially important as other components can also be added to the same bus and could listen to the traffic. A key-exchange protocol such as the well-known Diffie-Hellman key-agreement protocol is used to establish the secure communication channel. Alternatively, other conventional cryptographic techniques can be used to establish the secure channel between smart card 246 and module 222 (and, if used in the implementation, between the content protection controller module 238

Additionally, in one implementation content protection controller module 238 requires module 222 to have an appropriate license or certificate in order to access smart card 246. Such a requirement prohibits a malicious user from inserting his or her own module into system 220 and accessing smart card 246 to decrypt content.

Figure 4:
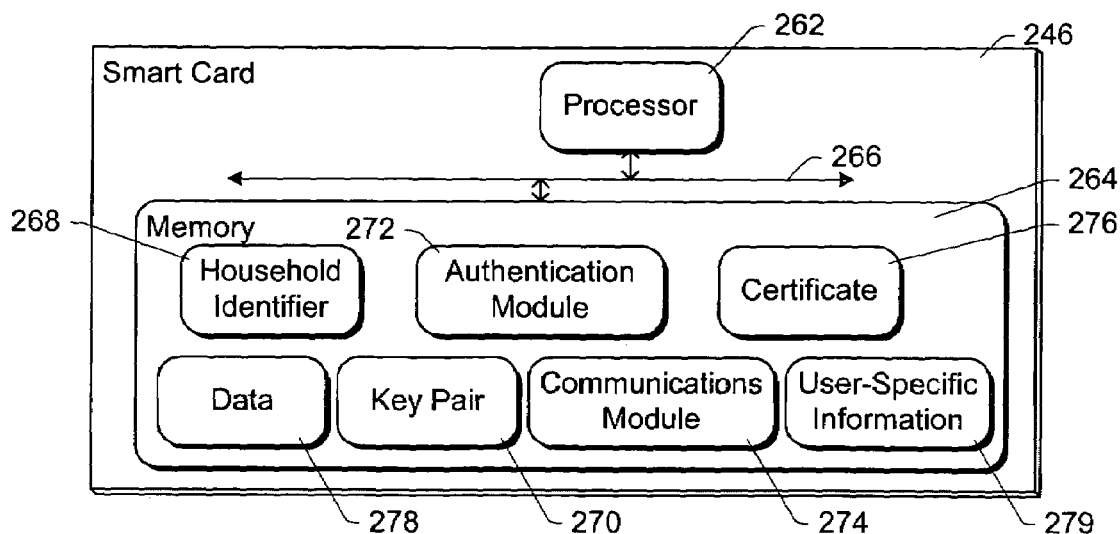
FIG. 4 is a block diagram illustrating an exemplary smart card that can be used in accordance with certain embodiments of the invention.

FIG. 4 is a block diagram illustrating an exemplary smart card that can be used in accordance with certain embodiments of the invention. Smart card 246 includes a processor 262 and memory 264 coupled together by an internal bus 266. Memory 264 represents any of a variety of nonvolatile storage components, such as ROM or flash memory. Alternatively, if smart card 246 were to have a separate power source (e.g., a small battery), memory 264 could also include volatile memory. Memory 264 includes a household identifier 268, a private key/public key pair 270, an authentication module 272, a communications module 274, and a certificate 276.

Key pair 270 includes both a public key and a private key as used in public key cryptography. The private key from key pair 270 is combined with household identifier 268 and the combined value is provided to encrypting module 222 via the secure communication channel to encrypt the media content. The private key of key pair 270 and household identifier 268 can be combined in any of a variety of manners, such as concatenating the values or performing other calculations based on the values (e.g., the private key exponentiated to the power of the household identifier, the two values multiplied or added together, etc.).

Alternatively, the household identifier may not be a value separate from the private key of key pair 270. In this implementation, the private key from key pair 270, for example, can act as the household identifier.

In another alternative, the encrypting of the media content is controlled by module 222, but the actual encryption is performed by processor 262 on smart card 246. According to this alternative, the data to be encrypted is passed via the secure communication channel to smart card 246. Processor 262 executes the encryption algorithm to encrypt the data based on the private key of key pair 270 (and household identifier 268, if separate from the private key) and returns the encrypted data to module 222 via the secure communication channel. This alternative has the benefit of smart card 246 not divulging its private key to module 222.

In another alternative, household identifier 268 is stored wholly (or in part) within various modules 222–238 of FIG. 3 or elsewhere in system 220. According to this alternative, module 222 encrypts the media content based on a combination of the part of identifier 268 stored in modules 222–238 and the part of identifier 268 stored on smart card 246 (and or the private key of key pair 270).

In the illustrated example, smart card 246 is tamper-resistant, providing secure storage for identifier 268, certificate 276, key pair 270, as well as any other data or information stored on smart card 246.

Authentication module 272 operates in conjunction with module 222 to establish the secure communication channel between module 222 and smart card 246. Communications module 274 manages communication with module 222 via the secure communication channel. Communications module 274 also, in various implementations, combines the private key of key pair 270 with the household identifier 268, receives data (e.g., media content, a portion of a household identifier, etc.) from module 222, and/or transmits a key to be used for encryption to module 222.

Certificate 276 is a certificate that is digitally signed by a trusted licensing authority (also referred to as a certificate authority or certifying authority) testifying that the smart card 246 is authentic. Certificate 276 includes the public key of key pair 270, the public key of the licensing authority, and the above testimony, and is digitally signed by the licensing authority using the private key of the licensing authority. This digitally signed certificate allows module 222, knowing the public key of the licensing authority, to verify that the certificate that is presented by smart card 246 was indeed digitally signed by the licensing authority.

The certificate can be digitally signed by the licensing authority applying a conventional encryption algorithm along with its private key to the certificate to generate a digital signature. This digital signature is forwarded to module 222 along with the certificate. The recipient can decrypt the digital signature using the licensing authority's public key and compare the decrypted certificate to the received certificate. If the two certificates match, then the recipient is ensured that the licensing authority did in fact sign the certificate and that the certificate has not been altered since it was signed. Alternatively, rather than applying an encryption algorithm to the certificate itself, the digital signature may be generated by applying the encryption algorithm to a hash value generated based on the certificate and a known hash function. The digital signature can then be verified by module 222 applying the known hash function to the received certificate and comparing this generated hash value to the decrypted digital signature. If the two hash values match, then module 222 is ensured that the licensing authority did in fact sign the certificate and that the certificate has not been altered since it was signed.

In addition to receiving the certificate, module 222 verifies that the licensing authority is itself trustworthy. Module 222 verifies that the licensing authority is trustworthy by establishing a "chain" of one or more certificates ranging from the licensing authority up to a root certificate. System 220 maintains a root certificate for each licensing authority that system 220 trusts. Each root certificate is a self-signed certificate that is implicitly trusted by system 220. Upon receipt of the smart card certificate 276, module 220 attempts to establish a chain of certificates from the certificate 276 up to one of the trusted root certificates. This chain may include one or more "intermediate" certificates. Each certificate in the chain will have a "parent" certificate that can cryptographically verify the authenticity of the certificate (e.g., by being digitally signed by the parent). Eventually, the chain leads back to a parent certificate that is one of the trusted root certificates. If such a certificate chain can be established by module 222, then the licensing authority is considered trustworthy. However, if such a certificate chain cannot be established, then the licensing authority is not considered trustworthy and module 222 will not descramble and encrypt the media content.

The smart card 246 can be further authenticated by using challenge data. Module 222 initially sends a challenge (e.g., a random number generated by module 222), also referred to as a "challenge nonce", to smart card 246. Upon receiving the challenge nonce, smart card 246 responds to the challenge by digitally signing the received random number using the private key of key pair 270. This signed number is then returned to module 222 as the response.

Upon receiving the response, module 222 verifies the response. The response is verified using the public key of key pair 270, which is known to module 222. The public key can be made known to module 222 in any of a variety of conventional manners, such as from certificate 276. As only smart card 246 knows the private key of key pair 270, the module 222 can verify the authenticity of smart card 246 by evaluating, using the public key of key pair 270, whether the random number was properly digitally signed with the private key of key pair 270.

In certain implementations, additional data 278 is stored on smart card 246 that is perceived or anticipated to be of value to the user of smart card 246. By attaching such value to smart card 246, a user of smart card 246 is more apt to keep track of smart card 246. Without such value attached to smart card 246, a user has little incentive to keep his or her smart card secure (e.g., not loan or give it to friends, family, and/or strangers). However, if there is something that the user perceives as valuable stored on smart card 246, he or she has a strong incentive to keep the card secure.

Such additional value can be added to smart card 246 in any of a wide variety of manners. For example, smart card 246 can have electronic money stored on the card which can be used by the cardholder to purchase goods and/or services (e.g., pay-per-view movie, goods from other retailers, services from other vendors, etc.). In this example, a threshold amount of electronic money must be on smart card 246 in order for smart card 246 to be used for decryption (or alternatively for encryption as well). If at least that threshold amount of electronic money is not on smart card 246, then module 222 (or smart card 246) will not perform the decryption. The user thus has an incentive to keep track of his or her smart card—if he loses the card then the electronic money on the card is also lost, or if he gives it to someone else that person(s) can spend the electronic money on the card.

Other user-specific information 279 related to the rendering of media content may also be stored on smart card 246. By way of example, a user's preferred channels, preferred viewing times, preferred type of content, etc. can all be stored on smart card 246. Such preferences can be input manually by the user or alternatively learned automatically (e.g., by system 220) and stored on smart card 246. These preferences are thus carried with the user, allowing them to be immediately available when the user is using a different system (e.g., in another room of his or her house, a hotel room, etc.). These preferences can be kept secure by the user on smart card 246 because as soon as smart card 246 is removed from the system, no device or component will be able to access the information on smart card 246. The fact that the data is only stored on the card, rather than hard disk, can be verified by an independent consumer privacy watchdog body. Further privacy can be obtained by allowing a user to purchase smart card 246 anonymously (e.g., using cash), so that there is nothing tying the identity of the user to the smart card 246.

Returning to FIG. 3, once the media content is encrypted by module 222, it can be made available to other modules 224–238 without fear of being used inappropriately. Some modules 224–238 are able to carry out their functions based on the encrypted content, while others decrypt the content before carrying out their functions. Any module 224–238 which needs to decrypt the media content communicates with smart card 246 to perform the necessary decryption based at least in part on household identifier 268 maintained on smart card 246. The exact manner in which the content is decrypted is dependent on the encryption scheme used to encrypt the content. The communication with smart card 246 by any other module 224–238 is analogous to that discussed above with respect to module 222 (including establishment of a secure communication channel and authentication of smart card 246). Once the module is finished its processing of the content, the processed content is re-encrypted (in a manner analogous to the encryption discussed above with reference to module 222) before being passed to another module.

Figure 5:
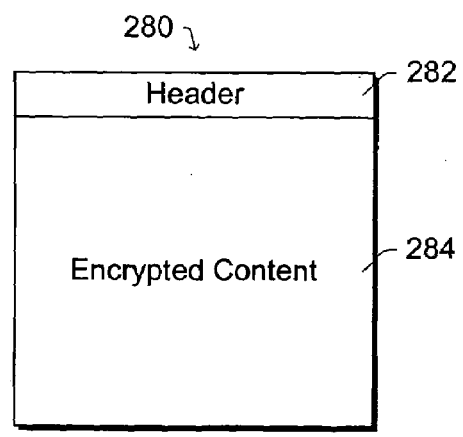
FIG. 5 illustrates an exemplary packet of encrypted content in accordance with certain embodiments of the invention.

The encrypted content is output by descrambling and encrypting module 222 in packets. FIG. 5 illustrates an exemplary packet of encrypted content in accordance with certain embodiments of the invention. Packet 280 is illustrated including header information 282 and corresponding encrypted content 284. Encrypted content 284 includes the media content data (e.g., the audio data or the video data) that has been encrypted by module 222, and header information 282 includes information describing the media content. The header information 282 can vary in different implementations. Examples of such information include a packet identifier (e.g., that explicitly or implicitly identifies the order of receipt or rendering of the packet 280 relative to other packets 280), content type (e.g., whether encrypted content 284 is audio, video, text, etc.), source of the content, restrictions as to its use, etc.

In the illustrated example, only the content is encrypted by module 222—the header information 282 remains unencrypted. By not encrypting the header information 282, some components 224–236 in system 220 of FIG. 3 can operate on the information without decrypting the actual content. For example, module 228 or module 230 can save the packet 280 to storage device 290 without decrypting the encrypted content 284. Alternatively, the entire packet 280, including header information 282, may be encrypted.

Returning to FIG. 3, descrambling and encrypting module 222 outputs the encrypted media, in the form of packets, to demultiplexing module 224. Demultiplexing module 224 analyzes the header information and forwards packets of video content to video analyzer module 226. Other packets are forwarded directly to rendering delay module 228.

The example video analyzer module 226 analyzes video content in an attempt to identify scene changes. In order to analyze the video content, the media content is decrypted by module 226. The video content is then analyzed, re-encrypted, and forwarded to rendering delay module 228. The same process applies to any other module that needs to process the actual video or audio content.

Rendering delay module 228 stores the encrypted content to storage device 290 for delayed viewing. Similarly, time shifting module 230 stores the encrypted content to storage device 290 for subsequent retrieval. The functionality of modules 228 and 230 is similar. However, delay module 228 is primarily intended to temporarily delay rendering of the content (e.g., a movie is paused while the viewer gets a snack), whereas time shifting module 230 is primarily intended to store the content for viewing at a later time (e.g., the following weekend).

Storage device 290 can be any of a wide variety of fixed or removable storage devices, such as a hard disk, a magnetic tape, an optical disk, etc. Modules 228 and 230 are illustrated as storing encrypted content on the same storage device 290. Alternatively, different storage devices may be used for each of the modules 228 and 230 (or multiple storage devices may be shared by modules 228 and 230).

Neither module 228 nor module 230 decrypts the encrypted content. Thus, the content, as stored on storage device 290, is in encrypted form. This prevents the content from being copied from storage device 290 and rendered at another location, as discussed in more detail below. The recording is only useful if a smart card with the correct household identifier is available for the decrypting.

The encrypted content is also forwarded to home network module 232. Home network module 232 can transmit the encrypted content to another computing device (or alternatively a storage device) via network interface 292. Analogous to modules 228 and 230, network module 232 does not decrypt the encrypted content. Thus, the destination of the content over network interface 292 cannot render the content without smart card 246 to decrypt the content.

The encrypted content is also provided to MPEG decoder module 234. MPEG decoder module 234 decodes (e.g., decompresses) the encoded content (which is encoded in an MPEG format in the illustrated example). Module 234 decrypts the encrypted content prior to decoding the media content, and outputs the decoded content to content renderer module 236. Module 234 can, after decoding the media content, optionally encrypt the decoded content. Whether module 234 encrypts the decoded content is dependent on whether a secure communication channel exists between modules 234 and 236. If there is a secure communication channel (e.g., the modules 234 and 236 are on the same expansion card within system 220, or are within the same display device), then encryption is not necessary. Content renderer module 236 renders the media content via rendering device 294. Although illustrated as a single decoder module 234 and a single renderer module 236, multiple such modules may be included (e.g., one for each type of media content, such as one for audio content and one for video content). Additionally, multiple rendering devices may be included (e.g., one for visual content and another for audio content).

Alternatively, if a secure communication channel between modules 234 and 236 is not included, then the decoded content is encrypted by decoder module 234. The encrypted decoded content is then forwarded to renderer module 236, and is decrypted by module 236 (if there is a secure communication channel between module 236 and rendering device 294), or is decrypted by rendering device 294 (if there is not a secure communication channel between module 236 and rendering device 294).

System 220 illustrates an exemplary computing device that can receive, store, transmit over a network, and render media content. Alternative systems need not include all of this functionality. For example, a server system may be able to receive media content, store the content, and transmit the content to another computing device via a network interface, but have no rendering ability. By way of another example, a system may be able to receive and render media content, but have no ability to store the content for later viewing or transmit the content to another computing device over a network.

Furthermore, media content may not be processed by every module illustrated in system 220. For example, media content may be transferred from demultiplexing module 224 directly to decoding module 234, bypassing modules 226, 228, 230, and 232.

Specific examples of modules for processing media content are illustrated in FIG. 3. These modules 222–238 are exemplary only—any of a wide variety of additional modules may also be included in system 220. Examples of additional modules include: a signal range selector corresponding to reception hardware (e.g., for antenna selection); a frequency selector to filter particular frequencies; an encoder (e.g., an MPEG encoder), to translate analog signals into digital bit streams; a packager (or tuner capturer) to separate the digital stream into packets and perform Forward Error Correction (FEC); a stream selector (or demultiplexer) to select particular packets from the stream; a stream selection filter to perform additional filtering of packets; an Ethernet packager to package packets into Ethernet frames; etc.

As illustrated in FIG. 3, the media content is communicated to different modules in 220 in an encrypted manner. Any module which processes the content in a manner that requires the content to be decrypted, decrypts the content, processes the content, and re-encrypts the processed content. Thus, the media content is only in decrypted form when it is actually being processed by a particular module. In one implementation these modules are required to be licensed, making their integrity and trustworthiness are inherent.

Additionally, in one implementation memory obfuscation techniques are used to provide additional security for the content when it has been decrypted and is being processed by one of the modules. Typically, when the content is decrypted it is stored in system memory (e.g., RAM), to allow for processing of the content by the module. However, the decrypted content can be vulnerable to a malicious user when it is stored in system memory. Memory obfuscation techniques can then be used to protect the content, even when in decrypted form. Any of a variety of conventional memory obfuscation techniques can be used to obfuscate the code of one or more of modules 222–238.

System 220 thus allows media content to be tagged to a particular household. The media is encrypted based on smart card 246, thereby requiring smart card 246 to be present in order to decrypt and render the stored content. This decryption and rendering can be performed by any system 220 to which smart card 246 is in communication (e.g., plugged into), such as the system 220 that recorded the content or a system 220 at a friend's house if smart card 246 is taken to the friend's house. Alternatively it can be a physically different smart card, but only if that smart card has the same household identifier stored (securely) inside.

Figure 6:
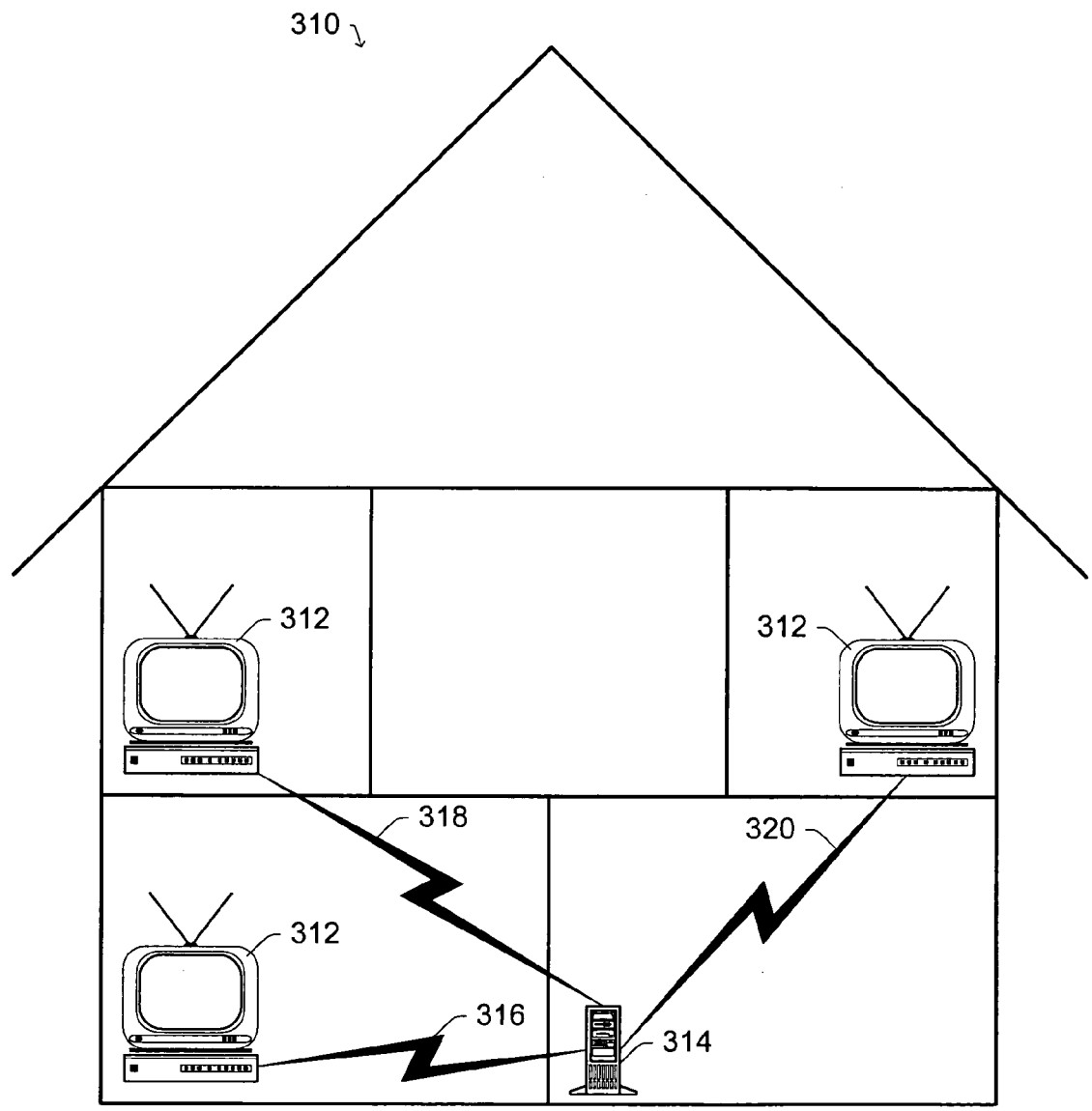
FIG. 6 is a block diagram illustrating an example of a networked media content rendering and storage environment in accordance with certain aspects of the invention.

FIG. 6 is a block diagram illustrating an example of a networked media content rendering and storage environment in accordance with certain aspects of the invention. A house 310 is shown including multiple rendering systems 312 (one in each of multiple rooms of house 310) and a server system 314. Network couplings 316, 318, and 320 operate to establish communication links between each of rendering systems 312 and server 314, and may also establish communication links between the other rendering systems 312. Any of a variety of communication links can be supported, including both wired and wireless links.

Media content is received into household 310 at server 314 and transmitted (in encrypted form) to the rendering system(s) 312 desired by the user. The content can be transmitted in its entirety prior to beginning rendering, or alternatively streamed to the rendering system(s) 312 so that rendering can begin before all of the content is transferred (such as in accordance with the ASF (Advanced Streaming Format) standard or other formats or standards). Additional information regarding ASF is available from Microsoft Corporation of Redmond, Wash. Each rendering system 312 includes a smart card reader that allows communication between the rendering system and a smart card so that encrypted media content received from server 314 can be decrypted and rendered. Additionally, server 314 includes a smart car reader that allows server 314 to encrypt received media content.

Alternatively, media content may be received at one or more of the rendering systems 312 and rendered and/or stored at that rendering system, transferred to another rendering system (for rendering or storage), or transferred to server 314 for storage. Any such transfers to other rendering systems or server 314 are transfers of the media content in encrypted form.

In one implementation, each of the rendering systems 312 is a system 220 of FIG. 3. Alternatively, some of the rendering systems 312 may not include all of the modules, or be coupled to all of the devices, as is system 220. By way of example, a rendering system 312 may be able to receive media content via the network and decrypt the media content, but not be able to descramble or store the content (e.g., modules 222, 224, 226, 228, and 230 of FIG. 3 would not be included, and the system would not be directly coupled to set top box 242 or storage device 290).

In one implementation, server 314 is a system 220 of FIG. 3. Alternatively, server 314 may not be able to render media content (e.g., modules 232, 234, and 236 of FIG. 3 would not be included, and the server would not be directly coupled to a rendering device 294).

Multiple similar smart cards 246 can be issued to a household (e.g., a user or group of users, such as a family), each including the same household identifier and/or key pair. Other information could differ among cards, but the information used to encrypt and decrypt the media content (e.g., the household identifier and/or key pair) needs to be the same for all such cards so that any one can decrypt content encrypted by another one of the cards. Such multiple keys allows multiple systems (e.g., multiple rendering systems 312) within a household to render content concurrently (or not concurrently, but also not requiring the smart card to be carried from one system 312 to another).

By encrypting the media content using a smart card 246, and correspondingly requiring a smart card 246 for decryption, limitations are placed on the ability to render (playback) the content. This effectively creates a boundary to the user's network, the boundary being defined by wherever the smart card 246 goes (e.g., within house 310). This effective boundary prevents a malicious user from copying useable media content to a server on the Internet. Although such a user could copy the encrypted media content to a server on the Internet, no one else would be able to decrypt it without that user's smart card. A user would, however, be able to copy the encrypted media content to a server on the Internet and then subsequently retrieve the content from that server and render it providing the user had a smart card with the household identifier used to encrypt the media content.

Figure 7:
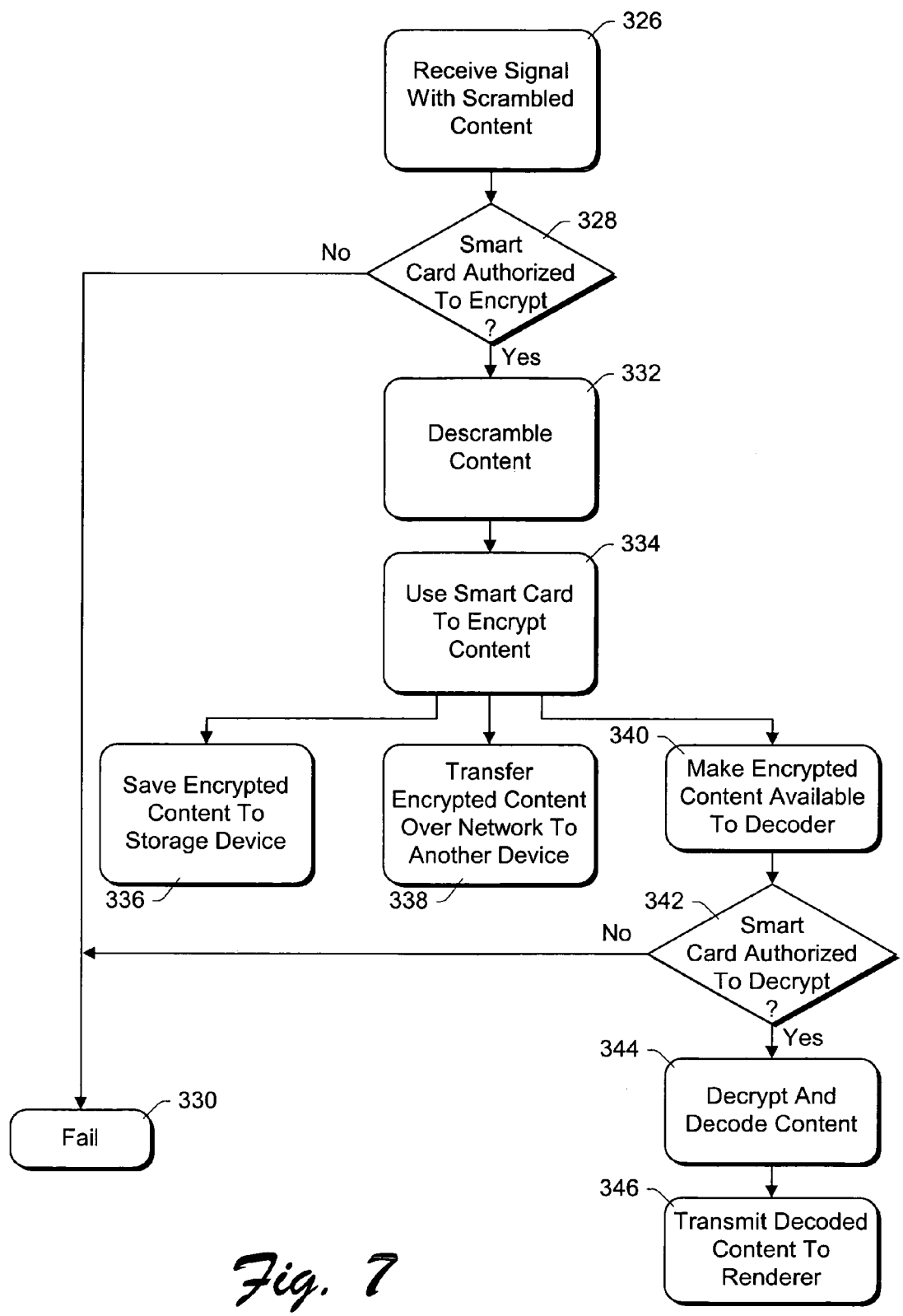
FIG. 7 is a flowchart illustrating an exemplary process for receiving and handling media content in accordance with certain embodiments of the invention.

FIG. 7 is a flowchart illustrating an exemplary process for receiving and handling media content in accordance with certain embodiments of the invention. The process of FIG. 7 is implemented by a system 220 of FIG. 3, and may be performed in software. FIG. 7 is described with additional reference to elements of FIGS. 3 and 6.

Initially, a signal carrying scrambled media content is received (act 326). Descrambling and encrypting module 222 checks whether the smart card 246 is authorized to encrypt the media content (act 328). Any restrictions that are placed on the usage of smart card 246 to encrypt media content (e.g., the smart card being able to authenticate itself, greater than a threshold amount of electronic money being stored on the card, etc.) must be satisfied in act 328. If at least one of the restrictions is not satisfied, then the descrambling and decrypting process fails (act 330). However, if all of the restrictions are satisfied, then descrambling and encrypting module 222 removes the scrambling of the content (act 332). Alternatively, media content may be received in act 330 which is not scrambled, in which case act 332 can be skipped.

The descrambled content is then encrypted by descrambling and encrypting module 222 based on smart card 246 (act 334). This encrypting is based, as discussed above, on a household identifier corresponding to smart card 246. Once the content is encrypted, different actions can be taken. Which action is to be taken can be determined automatically (e.g., according to behavior learned from previous user requests, according to default programming, according to commands embedded in the received media content, etc.) or manually (e.g., according to a specific user request for this content). In the illustrated example, these different actions include storing the content, transferring the content, and rendering the content.

If the content is to be stored, then rendering delay module 228 (or time shifting module 230) saves the encrypted content to storage device 290 (act 336). However, if the content is to be transferred, then home network module 232 transfers the content over a network to another computing device (e.g., another rendering system 312 or server 314 of FIG. 6) via network interface 292 (act 338).

On the other hand, if the content is to be rendered, then the encrypted content is made available to decoder module 234 (act 340). Decoder module 234 checks whether the smart card is authorized to decrypt the media content (act 342). This authorization process is analogous to that discussed above with respect to act 328, except that it is for decryption rather than encryption. If the smart card is not authorized to decrypt the media content, then the decryption and rendering process fails (act 330). However, if the smart card is authorized to decrypt the media content, then decoder module 234 decrypts and decodes the content (act 344), then transmits the decoded content to renderer module 236 for rendering on rendering device 294 (act 346). Alternatively, as discussed above with reference to FIG. 3, additional encryption of the decoded content may be performed by decoder module 234 and subsequent decryption performed by renderer module 236 or rendering device 294.

The process of FIG. 7 operates based on received media content. This media content can be operated on in different portions. The media content may be received in a format that separates the content into particular portions (e.g., packets or units) and these portions may be operated on individually. For example, descrambling and encrypting module 222 may descramble and encrypt each portion individually, each encrypted portion resulting in a packet (e.g., packet 280 of FIG. 5) to be forwarded to another module 224–236.

Alternatively, the separation of content into packets may be performed by a module of system 220, such as descrambling and encrypting module 222. According to this alternative, module 222 determines how to separate the incoming content into multiple packets (e.g., multiple packets 280 of FIG. 5). This determination can be made, for example, based on the format of the received signal and/or content.

Figure 8:
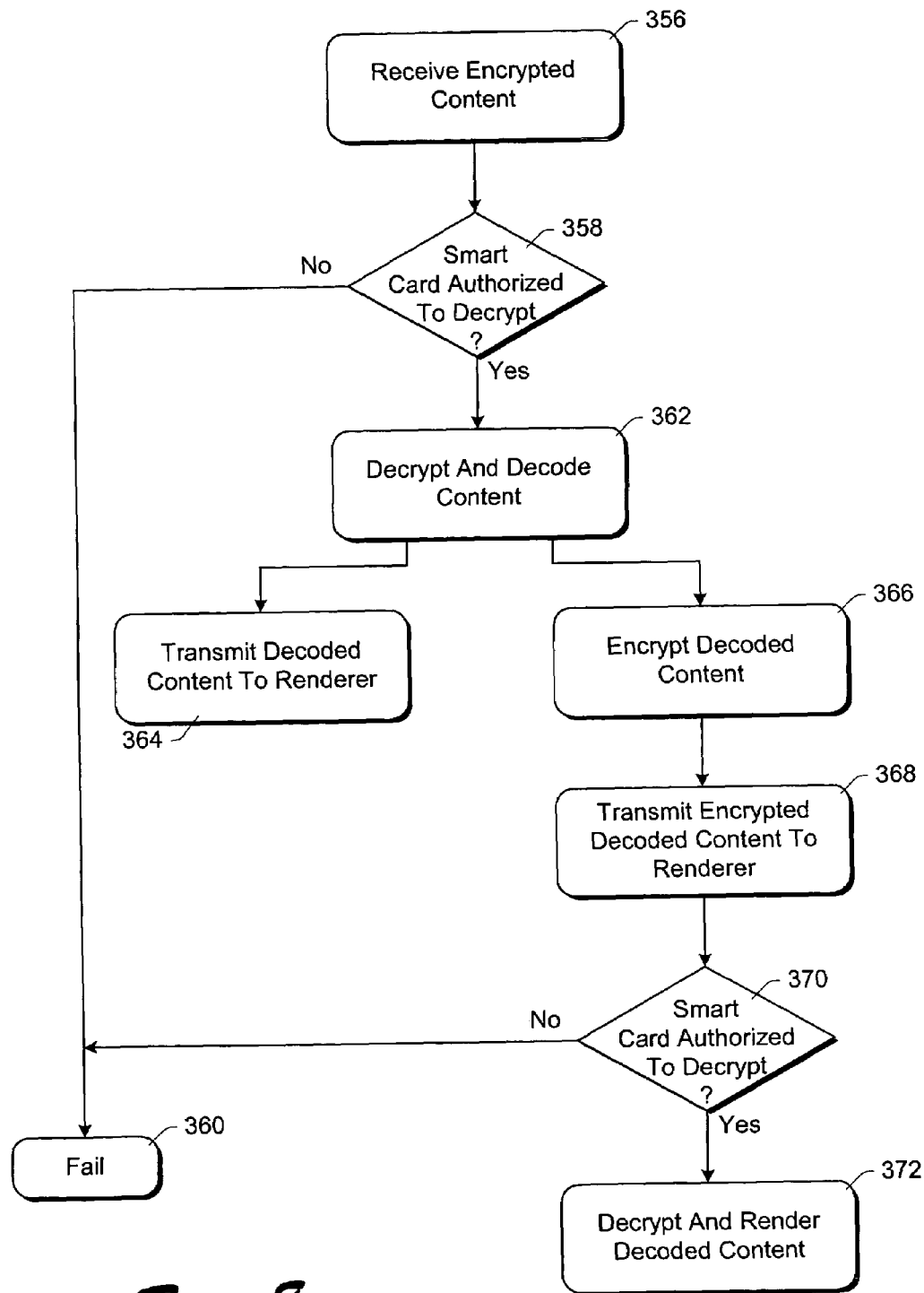
FIG. 8 is a flowchart illustrating an exemplary process for rendering media content in accordance with certain embodiments of the invention.

FIG. 8 is a flowchart illustrating an exemplary process for rendering media content in accordance with certain embodiments of the invention. The process of FIG. 8 is implemented by a system 220 of FIG. 3, and may be performed in software. FIG. 8 is described with additional reference to elements of FIGS. 3 and 7.

Initially, encrypted content is received by decoder module 234 (act 356). This encrypted content can be received from any of a variety of different sources, such as from storage device 290 via rendering delay module 228 or time shifting module 230, from another computing device via network interface 292 and home network module 232, directly from descrambling and encrypting module 222, from another processing module in system 220 (e.g., video analyzer module 226), etc.

In some instances, content can even be encrypted to a particular household (thereby requiring the smart card 246 to decrypt and render the content) prior to its transmission to the household. By way of example, in a content on-demand environment where media content is available to individual user's on demand (e.g., for a fee), the household identifier for the user can be made available to the on-demand provider (e.g., the household identifier may be transmitted to the provider along with the request for content, pre-payment of the fee, during an initial registration process, etc.), thereby allowing the provider to encrypt the content to the user. The content can then be transmitted to the user via any public, non-secure network(s) without concern on the part of the provider because only the user that paid for the content, with the appropriate smart card 246, will be able to decrypt and render the content.

Decoder module 234 checks whether the smart card is authorized to decrypt the media content (act 358). This checking is analogous to the checking discussed above with reference to act 328 of FIG. 7, except that it is for decryption rather than encryption. If the smart card is not authorized to decrypt the media content, then the decrypting and rendering process fails (act 360). However, if the smart card is authorized to decrypt the media content, then decoder module 234 decrypts and decodes the content (act 362).

Once the content is decrypted and decoded, different actions can be taken based on whether the content needs to be re-encrypted before being transferred to rendering device 294. If the data channel from decoder module 234 to rendering device 294 is secure, then additional encryption is not necessary and the decoded content is transmitted to renderer module 236 for rendering on rendering device 294 (act 364).

However, if the data channel from decoder module 234 to rendering device 294 is not secure, then decoder module 234 encrypts the decoded content (act 366). Decoder module 234 then transmits the encrypted decoded content to renderer module 236 (act 368). Although not shown in FIG. 8, decoder module 234 may optionally perform an additional check, prior to encrypting the decoded content (or prior to transmitting the encrypted decoded content), as to whether the smart card is authorized to encrypt the media content (analogous to act 328 of FIG. 7). If such a check is made and the smart card is not authorized to encrypt the media content, then the rendering process fails. Renderer module 236 checks whether the smart card is authorized to decrypt the media content (act 370). This checking is analogous to the checking discussed above with reference to act 328 of FIG. 7, except that it is for decryption rather than encryption. If the smart card is not authorized to decrypt the media content, then the decrypting and rendering process fails (act 360). However, if the smart card is authorized to decrypt the media content, then the encrypted decoded content is decrypted and rendered on rendering device 294 (act 372). The decryption of the encrypted decoded content can be performed by renderer module 236 (e.g., if there is a secure data path between module 236 and device 294) or alternatively by rendering device 294 (e.g., if there is not a secure data path between module 236 and device 294).

By requiring a smart card to render media content, various parental control schemes can be implemented using the smart card. In one such scheme, parents are able to restrict their children's ability to watch (and/or listen to) media content by restricting their children's usage of the smart card(s). By way of example, a parent can allow the child to use the card to decrypt content only during times of the day that the parent is willing to allow the child to view/listen to the content. When the parent takes the smart card away from the child (or removes the smart card from the system), the child is no longer able to view/listen to the content.

In another such scheme, a household can have multiple different smart cards and parents can use different smart cards for encrypting different categories of content. Thus, content that parents do not want their children to view/listen to is encrypted based on one card (e.g., a "parents" card, or an "R-rated" card), while content that children can view/listen to is encrypted based on another card (e.g., a "family" card, or a "G-rated" card). The parents can then insert the family/G-rated card when the children are awake, which cannot decrypt content that was encrypted based on the parents/R-rated card. Similarly, after the children are in bed, the parents/R-rated card can be inserted into the system, allowing the non-family oriented content to be decrypted and rendered.

In yet another such scheme, a rating (e.g., "parents", "R", "family", "PG", "G", etc.) is associated with and securely stored on the smart card (e.g., in data section 278 or elsewhere in memory 264 of FIG. 4). Media content can also include a corresponding rating for the content (e.g., in header 282 of FIG. 5). If the rating associated with the smart card does not match the rating of the media content, then the media content is not encrypted and/or decrypted by the system. This check can occur, for example, in the authorization checking steps 328, 342, 358, and 370 of FIGS. 7 and 8.

The ratings may also have an ordering (e.g., common movie ratings such as "G", "PG", "PG-13", "R", and "X"). In this situation, the media content can be encrypted and/or decrypted by the system only if the rating associated with the smart card is equal to or greater than the rating of the media content (e.g., using the movie ratings in the previous example, media content having a "PG-13" rating could be encrypted and/or decrypted using a smart card having an associated rating of "PG-13", "R", or "X").

Note that these parental controls can be effective regardless of whether the original media content received and encrypted was scrambled. By encrypting all media content that is available in the household, these parental control schemes can be used to restrict children's viewing of all content without regard for whether the content was originally scrambled.

The smart cards can further be used to maintain privacy of individual viewing habits within a household. Different users in the household can have their own smart cards for encrypting and decrypting media content. Thus, even if a user records media content on a system available to others in the household (e.g., server 314 of FIG. 6), no other member of the household will be able to identify what the content is because their individual smart cards cannot be used to decrypt the content. This can be useful, for example, if a user has risqué viewing habits that he or she desires to keep secret from other members of the household.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A smart card comprising:
a key, associated with a household, to be used to encrypt and decrypt media content at the household that is associated with the household, the key being a combination of a household identifier and a private key of a private key/public key pair; and
a memory unit, the memory unit including,
a user-specific information storage section to store user preferences, and
a data storage section to store data that is expected to be of value to a user.

2. A smart card as recited in claim 1, wherein the memory unit comprises a nonvolatile memory.

3. A smart card as recited in claim 1, wherein the data comprises electronic money.

4. A smart card as recited in claim 3, wherein the smart card can be used to encrypt and decrypt media content only if at least a threshold amount of electronic money is stored on the smart card.

5. A smart card as recited in claim 1, wherein the smart card corresponds to a particular category of media content and is used to encrypt and decrypt only that particular category of media content.

6. A smart card as recited in claim 5, wherein one of the categories of media content comprises family-oriented media content and another of the categories of media content comprises adult-oriented media content.

7. A smart card as recited in claim 1, wherein the memory unit further includes a rating associated with the smart card that is used to compare the rating with a rating corresponding to the media content and determine, based on the comparison, whether to allow access to the media content.

8. A smart card as recited in claim 1, wherein the smart card is used to limit where rendering of the media content can occur.

9. A smart card as recited in claim 1, wherein the user preferences comprise one or more channels preferred by the user.

10. A smart card as recited in claim 1, wherein the user preferences comprise one or more viewing times preferred by the user.

11. A smart card as recited in claim 1, wherein the user preferences comprise one or more types of content preferred by the user.

12. A smart card comprising:
a private key of a private key/public key pair;
a household identifier, associated with one particular household, to be combined with the private key, and the combined value to be used to encrypt and decrypt media content that is associated with the one particular household and that is to be rendered at the one particular household, but not to encrypt and decrypt media content associated with other households; and
a data storage section to store data that is expected to be of value to a user.

13. A smart card as recited in claim 12, further comprising a communications module to communicate, to a computing device module that encrypts media content, an indication of whether to encrypt the media content based on data stored in the data storage section.

14. A smart card as recited in claim 12, further comprising a communications module to communicate, to a computing device module that decrypts media content, an indication of whether to decrypt the media content based on data stored in the data storage section.

15. A smart card as recited in claim 12, further comprising a processor to execute instructions to encrypt and decrypt the media content.

16. A smart card as recited in claim 12, wherein the data storage section is maintained in a nonvolatile memory.

17. A smart card as recited in claim 12, further comprising a user-specific information storage section to store user preferences.

18. A smart card as recited in claim 12, wherein the data in the data storage section comprises electronic money.

19. A method of encrypting all media content received at a user's home from a programming source, the method comprising:
checking, at the user's home, whether a smart card is authorized to encrypt the media content; and
encrypting, at the user's home using a key that is a combination of a household identifier associated with the user's home and a private key of a private key/public key pair, the media content regardless of whether the received media content was received scrambled, but only if the smart card is authorized to encrypt the media content.

20. A method as recited in claim 19, further comprising determining that the smart card is authorized to encrypt the media content if at least a threshold amount of electronic money is available on the smart card.

21. A method as recited in claim 19, further comprising determining that the smart card is authorized to encrypt the media content only if data is stored on the smart card that is expected to be of value to a user.

22. A method as recited in claim 19, further comprising:
checking whether the smart card is authorized to decrypt media content; and
decrypting the media content only if the smart card is authorized to decrypt the media content.

23. One or more computer-readable memories containing a computer program that is executable by a processor to perform the method recited in claim 19.

24. A method of decrypting media content, the method comprising:
checking whether a portable integrated circuit device is authorized to decrypt the media content, wherein the portable integrated circuit device stores a decryption key and additional data, and wherein the decryption key is a combination of a household identifier and a private key of a private key/public key pair;
determining that the portable integrated circuit device is authorized to decrypt the media content only if data other than electronic money is stored as the additional data on the portable integrated circuit device, wherein the data is expected to be of value to a user, and wherein the data is not used to decrypt the media content; and
decrypting the media content only if the portable integrated circuit device is authorized to decrypt the media content.

25. A method as recited in claim 24, further comprising determining that the portable integrated circuit device is authorized to decrypt the media content if at least a threshold amount of electronic money is available on the portable integrated circuit device.

26. A method as recited in claim 24, further comprising:
checking whether the portable integrated circuit device is authorized to encrypt media content; and
encrypting the media content only if the portable integrated circuit device is authorized to encrypt the media content.

27. One or more computer-readable memories containing a computer program that is executable by a processor to perform the method recited in claim 24.

28. A system comprising:
a plurality of smart cards, each to be used for encrypting different categories of multimedia presentations; and
an encryption module coupled to receive a multimedia presentation and encrypt, at the user's home, the multimedia presentation based on a combination of a household identifier and a private key of a private key/public key pair maintained on one of the plurality of smart cards.

29. A system as recited in claim 28, further comprising a decoding module, coupled to receive the encrypted multimedia presentation, decrypt the encrypted multimedia presentation, decode the decrypted multimedia presentation, and transmit the decoded multimedia presentation to a rendering module.

30. A system as recited in claim 28, wherein one of the categories of multimedia presentations comprises family-oriented media content and another of the categories of multimedia presentations comprises adult-oriented media content.

31. A method of allowing parental control over media content, the method comprising:
receiving, at a household, media content;
encrypting, at the household, all of the received media content using a key corresponding to a smart card regardless of whether the received media content was received scrambled, wherein the key comprises a combination of a household identifier associated with one household and a private key of a private key/public key pair; and
requiring the smart card to be present to decrypt and render the media content.

32. A method as recited in claim 31, wherein the requiring comprises requiring the smart card to be inserted into a smart card reader coupled to a computing device that is decrypting the media content.

33. A method as recited in claim 31, further comprising using a plurality of different smart cards to encrypt and decrypt media content, each of the plurality of smart cards corresponding to a different category of media content.

34. A method as recited in claim 33, wherein one of the categories of media content comprises family-oriented media content and another of the categories of media content comprises adult-oriented media content.

35. One or more computer-readable memories containing a computer program that is executable by a processor to perform the method recited in claim 31.

36. A method of allowing parental control over media content, the method comprising:
comparing a rating corresponding to the media content to a rating associated with a smart card; and
allowing access to the media content if the rating corresponding to the media content does not exceed the rating associated with the smart card, wherein a plurality of ratings do not exceed the rating associated with the smart card, and wherein the allowing access comprises allowing the media content to be encrypted using a combination of a household identifier and a private key of a private key/public key pair, at a user's home, for subsequent processing.

37. A method as recited in claim 36, wherein the comparing comprises comparing the rating corresponding to the media content to the rating associated with the smart card as stored on the smart card.

38. A method as recited in claim 36, wherein the allowing access comprises allowing the media content to be decrypted for rendering.

39. One or more computer-readable media having stored thereon a computer program that, when executed by a computing device, causes the computing device to perform acts including:
receiving, at a household, media content;
controlling, at the household, encryption of the received media content based on a combination of a household identifier and a private key of a private key/public key pair corresponding to a smart card; and
maintaining user preferences information on the smart card, the user preferences information being available only when the smart card is coupled to the computing device.

40. One or more computer-readable media as recited in claim 39, wherein the smart card is coupled to the computing device when the smart card is inserted into a smart card reader that is coupled to the computing device.

41. A smart card comprising:
a key, associated with one particular household, to be used to encrypt and decrypt media content associated with the one particular household at the one particular household but not to encrypt and decrypt media content associated with other households, wherein the key is to encrypt all the media content associated with the one particular household without regard for whether the media content was received scrambled, and wherein the key comprises a combination of a household identifier of the one particular household and a private key of a private key/public key pair; and
a user-specific information storage section to store user preferences.

42. A smart card as recited in claim 41, further comprising a communications module to communicate, to a computing device module that encrypts media content, the user preferences stored in the user-specific information storage section.

43. A smart card as recited in claim 41, further comprising a processor to manage the user-specific information storage section.

44. A smart card as recited in claim 41, wherein the user-specific information storage section is maintained in a nonvolatile memory.

45. A smart card as recited in claim 41, further comprising a data storage section to store data that is expected to be of value to a user.

46. A method comprising:
maintaining, on an integrated circuit card, information regarding a user's preferences corresponding to media content; and
maintaining, on the integrated circuit card, a key to be used to encrypt and decrypt media content associated with one particular household at the one particular household but not to encrypt and decrypt media content associated with other households, wherein the key is to be used to encrypt all the media content associated with the one particular household without regard for whether the media content was received scrambled, and wherein the key is a combination of a household identifier of the one particular household and a private key of a private key/public key pair.

47. One or more computer-readable memories containing a computer program that is executable by a processor to perform the method recited in claim 46.

48. A method of identifying boundaries of a network of devices, the method comprising:

encrypting, at a single house using a key that is a combination of a household identifier and a private key of a private key/public key pair, media content based on an identifier corresponding to a plurality of smart cards regardless of whether the media content is received scrambled; and limiting rendering of the media content to a network of devices to which the plurality of smart cards are coupled, wherein the network of devices is maintained within the single house.

49. A method as recited in claim 48, wherein the network devices include devices to receive media content and devices to render media content.

50. A method as recited in claim 48, wherein one of the plurality of smart cards is coupled to a device when the smart card is inserted into a smart card reader coupled to the device.

51. A method as recited in claim 48, wherein the plurality of smart cards can be moved to different devices to alter the boundaries of the network.

* * * * *